US006592254B2

(12) United States Patent
Gul

(10) Patent No.: US 6,592,254 B2
(45) Date of Patent: Jul. 15, 2003

(54) MULTIPLE POINT AVERAGING DUCT TEMPERATURE SENSOR

(75) Inventor: S. Asim Gul, Orono, MN (US)

(73) Assignee: Mamac Systems, Inc., Eden Prairie, MN (US)

( * ) Notice: Subject to any disclaimer, the term of this patent is extended or adjusted under 35 U.S.C. 154(b) by 0 days.

(21) Appl. No.: 09/892,193

(22) Filed: Jun. 26, 2001

(65) Prior Publication Data

US 2002/0196837 A1 Dec. 26, 2002

(51) Int. Cl.$^7$ ................................................ G01K 13/02
(52) U.S. Cl. .................... 374/148; 374/115; 374/166; 374/185
(58) Field of Search ............................... 374/115, 148, 374/166, 185, 374; 338/26

(56) References Cited

U.S. PATENT DOCUMENTS

| | | | |
|---|---|---|---|
| 2,465,685 A | * 3/1949 | Henderson | 219/536 |
| 2,792,481 A | * 5/1957 | Wood | 174/84 R |
| 3,319,215 A | * 5/1967 | Moore | 439/281 |
| 3,380,304 A | * 4/1968 | Zysk | 374/136 |
| 3,396,357 A | * 8/1968 | Borg et al. | 29/595 |
| 3,653,262 A | * 4/1972 | Ehrenfried et al. | 374/142 |
| 4,251,794 A | * 2/1981 | Swenson | 338/22 R |
| 4,307,606 A | * 12/1981 | Johnson | 73/295 |
| 4,386,525 A | * 6/1983 | Mooney | 73/49.2 |
| 4,861,169 A | * 8/1989 | Yoshimura | 374/179 |
| 4,969,749 A | * 11/1990 | Hasselmann | 374/115 |
| 5,221,916 A | * 6/1993 | McQueen | 219/544 |
| 5,268,558 A | * 12/1993 | Youssef et al. | 219/209 |
| 5,454,641 A | * 10/1995 | Parker et al. | 236/DIG. 6 |

OTHER PUBLICATIONS

BetaTHERM Temperature Sensors Discrete NTC Thermistor Elements and Custom Probe Assemblies; 1996–1997 Catalog; Mar. 1996; (pp. 32).

* cited by examiner

Primary Examiner—Diego Gutierrez
Assistant Examiner—Lydia M. De Jesús
(74) Attorney, Agent, or Firm—Kinney & Lange, P.A.

(57) ABSTRACT

A multipoint temperature sensor for measuring fluid temperature in a duct includes multiple thermistors of equal resistance, spaced apart in a circuit. Each thermistor has a positive lead and a negative lead for connecting electrically with the circuit. Wires connect the thermistors such that half of the thermistors are placed in parallel with the other half of the thermistors. The total number of thermistors in the circuit is a perfect square. Shrinkwrap fits over the thermistors and the leads. Tabs disposed on bridging clips bend around the shrinkwrap and the wires on either side of each thermistor such that the tabs do not overlap the leads. All the wires between adjacent thermistors are contained in a single, plenum rated sheathing.

18 Claims, 6 Drawing Sheets

MULTIPLE POINT AVERAGING DUCT TEMPERATURE SENSOR

CROSS-REFERENCE TO RELATED APPLICATION(S)

None.

BACKGROUND OF THE INVENTION

The present invention generally relates to an apparatus for electronically sensing an average temperature. More specifically, the present invention relates to a temperature sensor which uses multiple, spaced sensors such as thermistors in a circuit, such as for use in monitoring an average air temperature across an area within a large ventilation (HVAC) system.

Controlled, forced-air ventilation systems are known which move air within buildings. In many ventilation systems, fans draw fresh outside air into a building, and exhaust stale interior air to the outside. The ventilation systems use with venting or ducts to provide an air flow path throughout the building, including to and from heaters and/or air conditioners. Often the ventilations systems perform heat transfer (recovery) between the interior air to be exhausted and the outside air being introduced. For proper control of these ventilation systems, parameters such as fan speeds or damper positions are set and changed based upon sensed air temperatures within the building or within the system. Particularly in systems where air of different temperatures mixes, it is important to be able to accurately determine average air temperature, such as the average air temperature across a vertical cross-section at a location within a duct.

An early type of structure for sensing average temperature in an air duct is a fluid-filled tube or capillary. The fluid placed in the capillary, such as an oil, has a known coefficient of thermal expansion. The capillary is positioned to extend its length across the area to be temperature-averaged. As the air temperature within the air duct increases, the oil within the capillary is heated, the volume of oil expands, and the length of capillary filled by oil increases. The height of the oil within the capillary is representative of the average oil temperature along the length of the capillary. Switches or set point controls are turned (on or off) based upon the height of the oil column, allowing control of the HVAC system.

The oil-filled capillary averaging sensor had several drawbacks. First, the oil-filled capillaries were expensive. The switches or set point controls required to produce an electrical output added further expense. The capillary system had a relatively high thermal mass, and a correspondingly slow response time to changes in temperature. To minimize thermal mass, the capillaries could be made thinner, but thinner capillaries become increasingly fragile.

Today, electronically-based average temperature sensors have largely replaced the oil-filled capillary. Some electronically-based temperature sensors use a thin platinum wire to replace the oil-filled capillary. For example, platinum resistive temperature detectors were formed of a five mil thick strand of platinum, which is extended across the area to be sensed. The electrical resistance of the platinum strand changes as a function of temperature, and sensing the resistance of the platinum strand allows a determination of average temperature across the length of the strand. The platinum resistive temperature detector thus allows for direct electrical sensing of changes in temperature. Similar to the very thin capillaries, the thin platinum strands are quite fragile. To prevent damage to the very thin platinum detectors, the wire has been placed inside an electrically insulating sheath, which in turn has been placed within a flexible metal tube. The flexible metal tube can be bent and configured to fit within the ventilation channel to support the platinum strand at the positions for which temperature should be averaged.

Unfortunately, platinum is an expensive material, and even a thin strand of platinum adds significant cost. A reduced cost version of the platinum strand temperature sensor involves the use of thermisters. Thermisters, typically sintered metal oxides or alloys, also have an electrical resistance which changes based upon temperature. Thermisters can be commercially purchased at a much lower cost than the platinum strand. By treating the thermistor as a load resistor and measuring the voltage drop across the thermistor, an electrical circuit can detect changes in resistance. The sensed temperature can be obtained from an established lookup table, which provides a temperature value corresponding to the measured load resistance.

The sensing element of common thermisters is a bead about 1/10th of an inch in diameter. Leads extend to and from the sensing bead. To obtain an approximation of average temperature, multiple thermisters can be spaced in a circuit linking the thermisters in parallel or in series. The electrical resistance of the circuit is then indicative of the temperature at all of the thermister locations.

With the advent of electronic, computer-based controllers, lookup tables for rated thermisters have been installed in the controllers to translate between the sensed resistance and the temperature. If a parallel/series square array (2×2, 3×3, etc.) of thermisters is used, with the same number of thermisters in each series connection as number of series in the array, then the parallel/series square array has a resistance that approximates the resistance of a single thermister. Multiple point, parallel/series square thermister array temperature sensor have thus replaced the platinum strands and become commonly used for approximating average temperatures. The entire electrical circuit of the multiple point, parallel/series square thermister array has been placed in the metal tube of the prior platinum strand art for protection and support of the circuit.

Assembly of the electrical circuit of thermister arrays has been problematic. An insulative card has been used, allowing solder points between the leads for the thermister to the wires extending between thermister locations. The metallic nature of the tube requires dielectric insulation to prevent electrical shorting between the thermistors and the wall of the tubing. The insulation/metal tube support and protection configuration thermally insulates the platinum strand from the air, slowing the response time of the averaging temperature sensor. The soldering card further adds thermal ballast to slow response time. Response time in the control systems is fairly significant, because delays in control can lead to damage to system elements, particularly if the system manipulates outside air at a drastically different temperature than the inside air.

When the parallel/series square thermister array is housed in a tube, the actual placement of the thermisters within the tube is difficult to ascertain. Bending the tube improperly can cause inadvertent crimping and/or kinking of the metal, which could effectively sever the electrical connections or which could lead to small holes forming in the tube. Where small holes in a metal tube are created, cycled temperature differences can result in condensation on the inside of the tube which sometimes affect the accuracy of the temperature sensor. Condensation at the location of a thermistor could short-circuit the thermistor and lead to anomalous temperature readings.

The solder connections are exposed to tension and stresses associated with adjusting and bending the wires. Over time, the solder points weaken and electrical connections break. The resulting open circuit may be difficult to locate if the wire is placed inside a tube, and may be costly to repair no matter how the sensor is situated.

BRIEF SUMMARY OF THE INVENTION

A multi-point temperature sensor for measuring an average fluid temperature in a duct uses a number of thermistors spaced in a circuit. Each thermistor has a temperature sensing element and two (positive and negative) leads. The positive and negative leads are electrically connected into the circuit by insulated wires. Clips are secured adjacent to each thermistor. Each clip has attachment tabs for bending around the insulated wires on either side of each thermistor, and a bridging portion which can transfer stress through the clip rather than through the thermistor or through the electrical connection between wires and leads.

While the above-identified illustrations set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION

A multi-point averaging temperature sensor 10 includes number of sensing elements 12 connected by cables 14, 16, 18, 20 in a circuit arrangement. The averaging sensor 10 is arranged such that the sensing elements 12 are spaced along the length of the cables 14, 16, 18, 20 to form a string of sensing elements 12 each separated by a predetermined distance d. Each sensing element 12 includes a component which changes electrical response between the first and second leads as a function of temperature.

The preferred sensing elements 12 are thermistors, which change electrical resistance in a known manner responsive to changes in temperature. Such thermistors are commonly commercially available in various ohmic ratings, such as from BetaTHERM Corporation of Shrewsbury, Mass. For example, thermistors which have a nominal resistance at 25° C. of 0.1 k$\Omega$, 0.3 k$\Omega$, 1 k$\Omega$, 2 k$\Omega$, 2.2 k$\Omega$, 3 k$\Omega$, 5 k$\Omega$, 10 k$\Omega$, 30 k$\Omega$, 50 k$\Omega$, 100 k$\Omega$, and 1 M$\Omega$ are commonly used in the heating, ventilation and air conditioning ("HVAC") industry. Such thermisters may be formed by intimately blending high purity inorganic powders (typically transition metal oxides), which are then formed into large wafers, sintered and prepared for chip thermistor production. Each sensing element 12 has two electrical leads for connection into a circuit.

Figure 1:
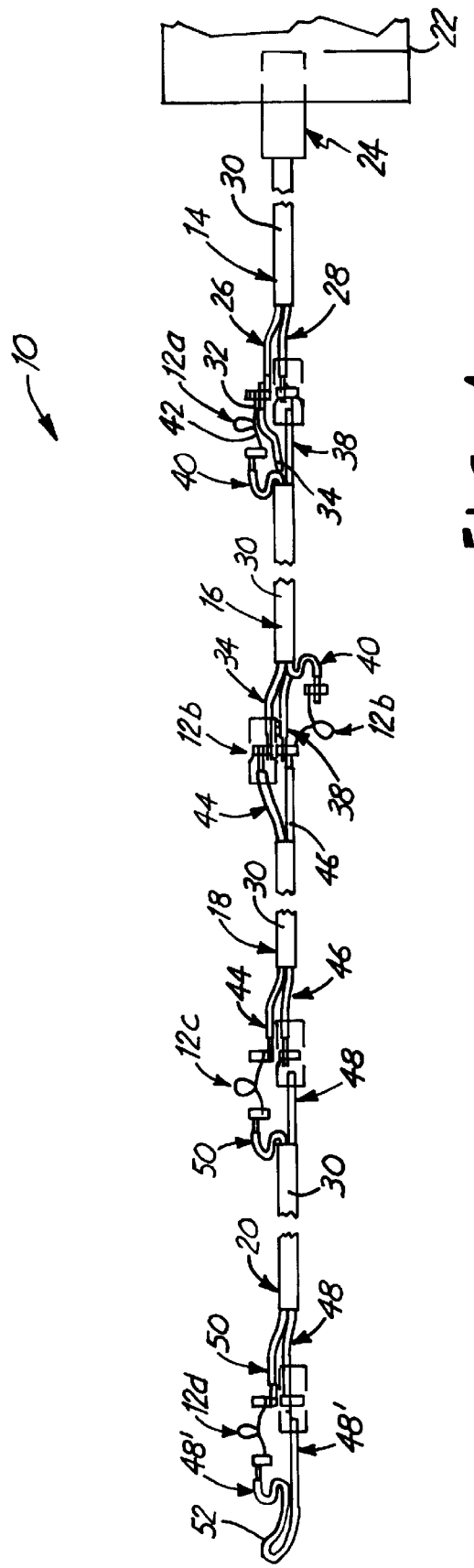
FIG. 1 is a schematic view of the temperature sensor of the present invention.

As shown in FIG. 1, the temperature sensor 10 is connected to a housing 22 by a connector 24. The housing 22 may be any type of electrical box suitable for mounting on the interior or exterior of a building such as on a duct. The housing 22 provides space for connections to other wires (not shown) to electrically connect the temperature sensor 10 to a HVAC controller. Alternatively, if spacing permits, the housing 22 may be part of the HVAC controller.

From the connector 24, a first length of cable 14 extends a distance d to the lead of the first thermistor 12a. The first length of cable 14 includes a positive voltage wire 26 and a ground wire 28 within sheathing 30. The terms "positive voltage" and "ground" are used merely for ease of reference, as the circuit may be wired with either wire 26 or wire 28 at a higher potential. This circuit is illustrated both in FIG. 1 and the circuit diagram of FIG. 2a.

The sheathing 30 terminates to provide assembly access to the positive voltage wire 26 and the ground wire 28. The insulators for positive voltage wire 26 and ground wire 28 are stripped to provide ends for electrical connection. The positive voltage wire 26 is electrically connected to the positive lead 32 of the thermistor 12. In the preferred series/parallel circuit, a parallel positive voltage wire 34 is also connected to the positive voltage wire 26. The parallel positive voltage wire 34 is necessary for the thermistors 12 for the opposite parallel leg(s) 36 of the circuit. The ground wire 28 is connected to a continuing ground wire 38. A series connection wire 40 is connected on the negative lead 42 of the thermister 12. Ends of parallel positive voltage wire 34, continuing ground wire 38 and series connection wire 40 are similarly stripped to make these connections.

A second length of cable 16 has the parallel positive voltage wire 34, the continuing ground wire 38, and the series connection wire 40 within sheathing 30. At the opposite end of the second length of cable 16, the series connection wire 40 is stripped and attached to the positive lead of the second thermister 12b. The continuing ground wire 38 is stripped and connected to the negative lead of the second thermister 12b. The parallel positive voltage wire 34 is connected to a continuing parallel positive voltage wire 44. A continuing parallel ground wire 46 is stripped and also connected to the continuing ground wire 38.

A third length of cable 18 has the continuing parallel positive voltage wire 44 and the continuing parallel ground wire 46 within sheathing 30. At the opposite end of the third length of cable 18, the continuing parallel positive voltage wire 44 is stripped and attached to the positive lead of the third thermister 12c. The continuing parallel ground wire 46 is stripped and connected to a second continuing parallel ground wire 48. A second series connection wire 50 is connected on the negative lead of the thermister 12c.

A fourth length of cable 20 has the second series connection wire 50 and the second continuing parallel ground wire 48 within sheathing 30. At the opposite end of the fourth length of cable 20, the second series connection wire 50 is stripped and attached to the positive lead of the fourth thermister 12d. The second continuing parallel ground wire 48 is stripped and connected to a third continuing parallel ground wire 48', which in turn is stripped and connected to the negative lead of the thermister 12d. The extension of the continuing parallel ground wire 48' provides a loop 52 which may be used to attach the sensor 10 during use. All the wires 26, 28, 34, 38, 40, 44, 46, 48, 48' are common electrical wires for carrying the specified current and voltage within a dielectric insulator. For instance, thermistors commonly use relatively low current, typically less that 100 μA, so the wires 26, 28, 34, 38, 40, 44, 46, 48, 48' can be about 30 A.W.G. or thicker, of a common conductor such as tin or copper, within a common insulator such as polyimide.

The sheathing 30 is electrically insulative and flexible. Each single piece of sheathing 30 defines a sheathing lumen which preferably contains all circuit wires running between adjacent, electrically connected thermistors 12. The preferred sheathing 30 also provides low flammability. For example, the sheathing 30 may be plenum-rated cable sheathing (such as UL-94 VO). Such sheathing is widely accepted for use in HVAC duct work due to its low flammability, and generally meets current building codes for use in HVAC ducts. Many other types of materials for sheathing 30 could be used, particularly if the temperature sensor 10 was not intended for use in HVAC ducts.

Figure 2A:
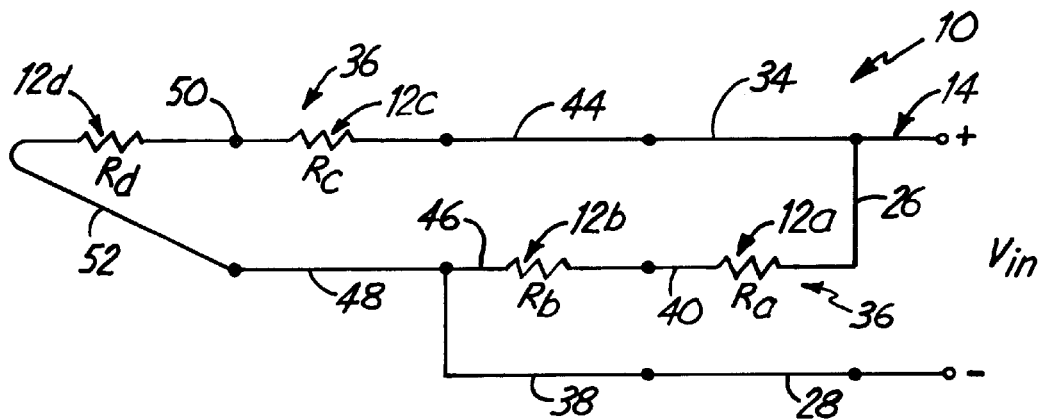
FIG. 2a is a circuit diagram of the temperature sensor of the present invention.

In the embodiment shown in FIGS. 1 and 2a, the sensor 10 uses four (4) thermistors 12a, 12b, 12c, 12d. The positive voltage is carried from the supply to the second half of the thermistors 12c, 12d, in sequence so that the first and second thermistors 12a, 12b are in parallel with the third and fourth thermistors 12c, 12d. In this parallel/series square array, if each thermistor 12 has a resistance of R, the equivalent resistance:

$$1/R_{eq}=1/(R_a+R_b)+1/(R_c+R_d)$$

If the resistance $R_a$, $R_b$, $R_c$ and $Rd$ are equal, the equation solves so the resulting equivalent resistance is $R_{eq}$=R. For example, if each thermistor 12 shown in FIGS. 1 and 2a has a value of three kilo-ohms (3 kΩ), then each of the two series sides of the circuit has approximately six kilo-ohms (3 kΩ+3 kΩ), and the total arrangement places 6 kΩ in parallel with 6 kΩ. The equivalent resistance of this arrangement is equal to $(1/6$ $kΩ+1/6$ $kΩ)^{-1}$, which is 3 kΩ. Generally, the manufacturer of the thermistors 12 provides a temperature look-up table to cross-reference between between resistance of a single thermister and sensed temperature. If the equivalent resistance of the circuit approximates the resistance of a single thermistor, then the same look-up table can be used to approximate the average of the sensed temperatures. Because different temperatures at each sensing point will produce a different resistance at each sensing point, the above-equation does not precisely solve for the average of each of the four resistances, but will only approximate the average resistance. The wider the temperature difference between sensing points, the less accurate the approximation. Nonetheless, the averaging approximation is accurate enough to be very useful in virtually all HVAC applications, provided a sufficient number of temperature sensing points are used.

The temperature sensor 10 of the present invention is particularly contemplated for use with an HVAC control unit. The control unit is electrically connected to the thermistor circuit. The control unit is capable of electrically determining resistance of the thermistor circuit. The control unit may include an A/D converter for converting an analog signal representative of the equivalent resistance into a digital resistance signal. Based upon the determined resistance, the control unit is capable of retrieving a temperature corresponding to the sensed resistance. For example, the HVAC controller used can be programmed to use the 3 kΩ thermistor look-up table, and the averaging temperature sensor 10 (using four 3 kΩ thermistors) can then simply replace a single thermistor in providing a temperature sensing circuit. The look-up table returns a value which approximates an average temperature of the air within the duct as sensed by the four thermistors 12 of the temperature sensor 10. The control unit then generates adjustment signals to the HVAC system based on the retrieved temperature.

Figure 2B:
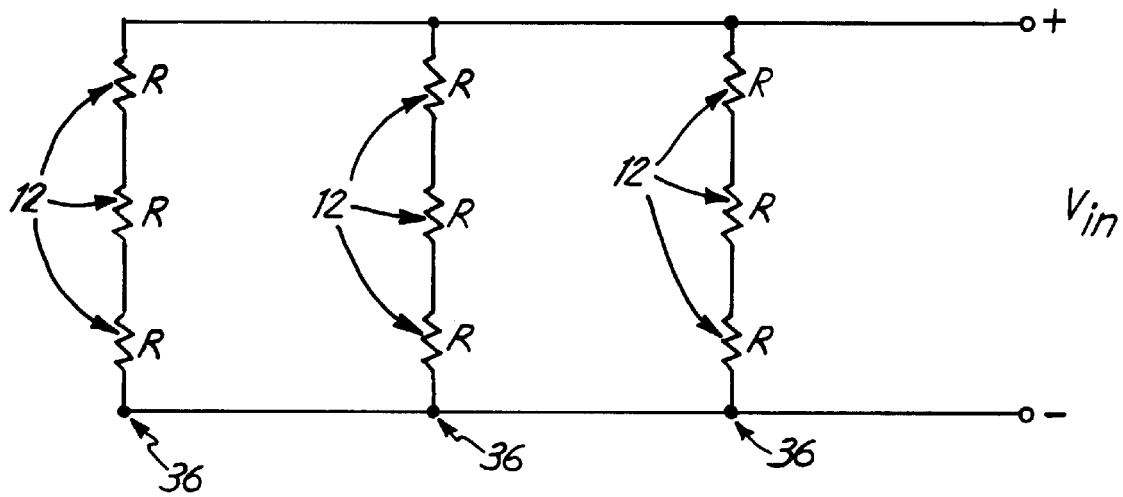
FIG. 2b is an alternative circuit diagram of the temperature sensor of the present invention.

Depending upon the application, more than four points of measurement may be desired for the averaging temperature sensor. As an alternative to the temperature sensor 10 with four thermistors 12, FIG. 2b depicts a circuit using nine thermistors 12. The nine thermisters are configured in a 3×3 arrangement, i.e., with three legs in parallel, and each leg having three thermistors 12. If each thermistor 12 has a resistance of R, the equivalent resistance is equal to 3R in parallel with 3R in parallel with 3R:

$$1/R_{eq}=1/3R+1/3R+1/3R$$

The resulting equivalent resistance is $R_{eq}$=R. Similarly, higher order square series/parallel arrays (4×4, 5×5, 6×6, etc.) can be similarly used with the original look-up table for the rated thermistor. The number of thermistors 12 may be adjusted according to the size of the area to be measured and/or according to the accuracy required. The term "square" as used herein does not refer to the physical spacing or distance between thermistors, which can be selected as desired, but rather to the circuit diagram layout.

Non-square series/parallel arrays (e.g, 1×4, 2×3) can also be used, if desired for particular applications. In either square series/parallel arrays or non-square series/parallel, some of the thermistors may have different nominal or rated resistances than others of the thermistors. Such non-square or differing rated resistance configurations may be beneficial particularly if different thermistors should be weighted differently in arriving at the "average" temperature. However, by using a square series/parallel array of identically rated thermistors, no research about the look-up table is necessary: the look-up table provided by the thermistor manufacturer adequately returns an approximated average temperature for the averaging temperature sensor 10.

As the temperature varies within a ventilation duct, the resistances vary so that the resulting resistance of each individual thermistor may increase or decrease. Due to these variations, the overall equivalent resistance will also change. Thus, multiple thermistors 12 may be employed to obtain a single equivalent or average temperature reading. The thermistors 12 are spaced along the length of the temperature sensor 10 as desired for positioning and support of the thermistors. In a preferred embodiment, the spacing d between thermistors 12 is selected to be equal, such as about three feet. In large industrial ducts, the air temperature may vary between the bottom and the top of the duct by several degrees. In particular, in areas within the duct work where return air is mixed with outside air, the disparity in temperature between the bottom half of the duct and the upper half of the duct may be quite large.

Figure 3:
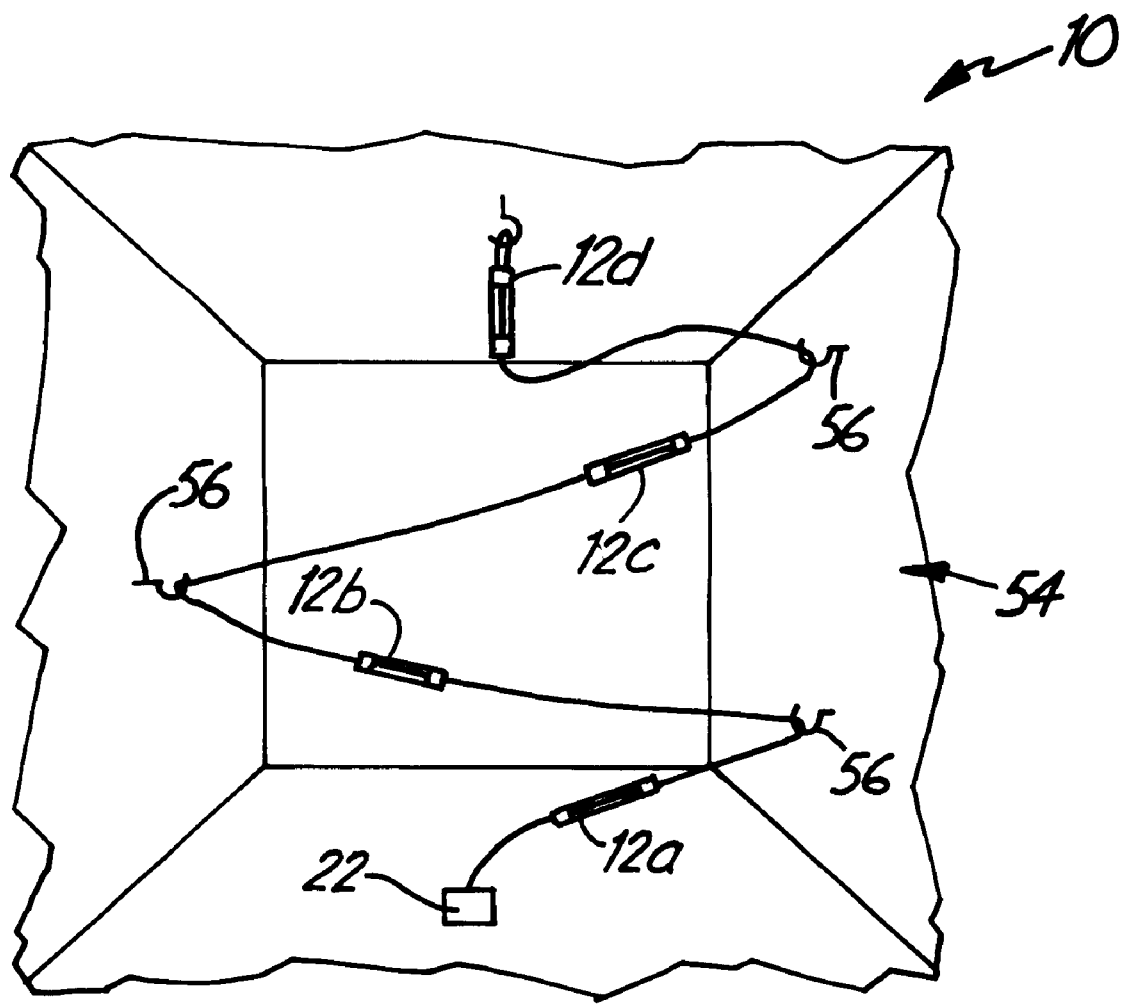
FIG. 3 is a plan view of the temperature sensor of the present invention in situ within an air duct.

The present invention is preferably arranged within a duct 54 as shown in FIG. 3. The arrangement shown corresponds to the four thermistor circuit of FIG. 2a. This arrangement spaces the thermistors 12 within a cross-sectional area of the duct and uses sensing points spaced (top, left, right, bottom) along the sides to the duct 54 to approximate an average temperature. The accuracy of the sensor 10 depends on the placement of the thermistors 12 within the duct 54 and number of thermistors 12 used. Large numbers of thermistors 12 results in more data points and therefore a more accurate sensed average temperature.

As shown in FIG. 3, the temperature sensor 10 is attached at the top of the ventilation duct 54. After the fourth thermistor 12d in the sensor 10, the second continuing parallel ground wire 32 may include an additional length exposed in a loop 52. The loop 52 is useful for attaching the temperature sensor 10 within air duct 54. The sensor 10 hangs from the ground wire loop 52. Separate hangers 56 may be secured to sidewalls of the duct 54 to string the sensor 10 horizontally within the duct 54. Thus, none of the thermistors 12 contact the metalwork of the duct 54, and duct 54 itself does not impact the air temperature measurements. Using attachments spaced along the peripheral walls of the duct 54, the thermistors 12 are spaced at various heights and locations within the duct 54 so as to take temperature readings from multiple points within a single cross-section of the duct 54. While the preferred use of the sensor 10 is to sense air temperature within a duct 54, the sensor 10 may also be used to sense flows of different fluids, and may further be used in other orientations.

The number of thermistors 12 used to generate the equivalent resistance determines the accuracy of the overall reading. Within ventilation ducts, it is common to mix outside air with recycled air from within the building. At the locations where the air mixes, there are temperature striations within the ducts. Air along the bottom of the duct may be at a significantly different temperature from air along the top of the duct. A single sensed temperature within the duct at this mix location is likely to return inaccurate readings. At such locations the multipoint averaging temperature sensor 10 of the present invention provides the most advantage.

Figure 4:
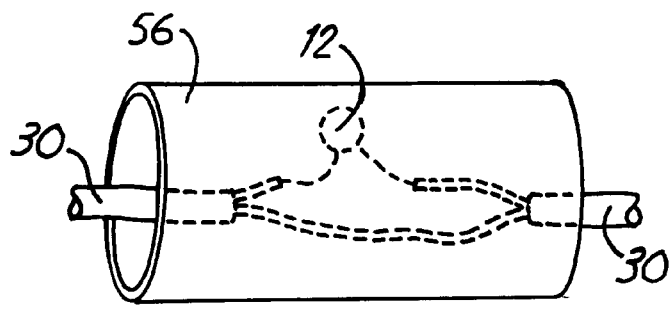
FIG. 4 is an enlarged view of the thermistor coupling with the shrinkwrap tubing extended over the connection.
Figure 5:
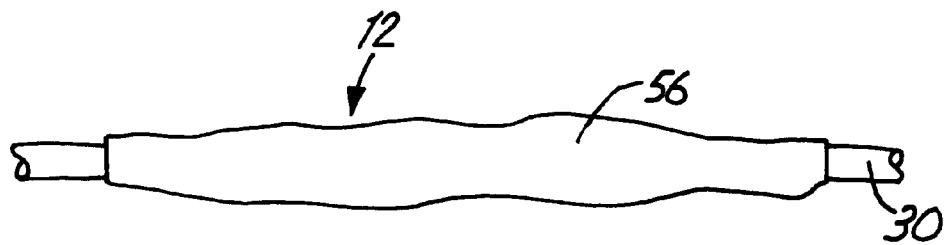
FIG. 5 is the thermistor coupling of FIG. 4 after the shrinkwrap process is completed.

FIGS. 4–8 show in detail the assembly process for each of the thermistors 12 of the schematics of FIGS. 1 and 2. As shown in FIG. 4, once the electrical connections are made, an insulator layer 56 is positioned over the thermistor 12. The insulator layer 56 is flexible and electrically insulative or dielectric. The preferred insulator 56 is plenum-rated like the sheathing 30, but is formed of an elastomeric, shrink wrap material.

For each thermistor 12, the shrink wrap 56 is cut into a tube and placed over the sheath 30 prior to making the electrical connections. The diameter of the shrink wrap 56 should initially (before shrinking) be sufficient to move freely in a longitudinal direction of the sheathing 30. In the preferred embodiment, the shrinkwrap 56 extends from the plenum-rated sheathing 30 on one side of the thermistor connection, over the thermistor 12, to the plenum-rated sheathing 30 on the other side of the thermistor connection The length of the shrink wrap 56 is thus cut so as to cover the exposed wires, the thermistor 12, the various connections, and the ends of the wire insulation up to the sheaths 30 on both sides, so that the entire connection area is covered. For instance, a tube of ¼ inch outside diameter shrink wrap 56 may be cut to a length of about four inches.

By positioning the shrinkwrap 56 so that overlaps the plenum-rated sheathing 30 on both sides of the thermistor connection, the connections are protected against tension placed on the cable. Instead, tension is transferred from the plenum-rated sheathing 30 to the plenum-rated sheathing 30 on the other side.

The shrinkwrap material should be as thin as possible without being so thin as to allow holes or to rupture upon shrinking. The thinner the shrinkwrap material, the less it thermally insulates its underlying thermistor 12, and the faster the thermal response of the sensor 10. If desired, the material of the shrinkwrap 56 may be specially fabricated to increase its thermal conductivity.

The preferred conductor connections are made by splicing. Spliced connections can be more quickly made during manufacturing than soldering or other types of connections. Because the present invention provides ample stress relief for the electrical connections, pulling out of the spliced connections is not a problem. Alternatively, the electrical connections may be made using a solder bead, adhesive, taping or through other means.

The shrinkwrap 56 helps to maintain the electrical connections by tightening around the existing connections. Whether the connections are made by splicing, using a solder bead, adhesive, taping or through other means, the shrinkwrap 56 helps secure the connections. The shrinkwrap 56 also effectively seals the electrical connections of the thermistor 12 from airflow, and avoids the condensation problems associated with prior art tubing.

The mounting of the sensor 10 shown in FIG. 3 inherently places tensile stress (line tension) along the longitudinal length of the sensor 10. Further, as air flow speed and direction changes within the duct 54, the thermistor circuit may shift or swing with the air flow. These shifts, over time, may weaken unsupported electrical connections. By shrink-wrapping the electrical connections, the shrinkwrap 56 helps transfer both the tensile stress and the bending stress from the electrical connections to the sheathing 30, thereby reducing wear and stress on the electrical connections. By extending the shrinkwrap 56 to cover the ends of the sheathing 30, the shrinkwrap 56 somewhat helps transfers tensile stress along the sensor 10 without placing tensile stress on the connection points of the thermistor. Thus, the shrinkwrap 56 improves the durability of the sensor 10.

Figure 6:
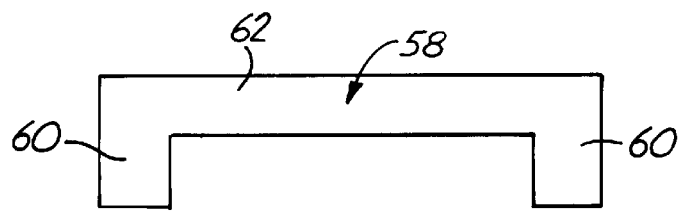
FIG. 6 is a plan view of the bridging clip of the present invention.
Figure 7:
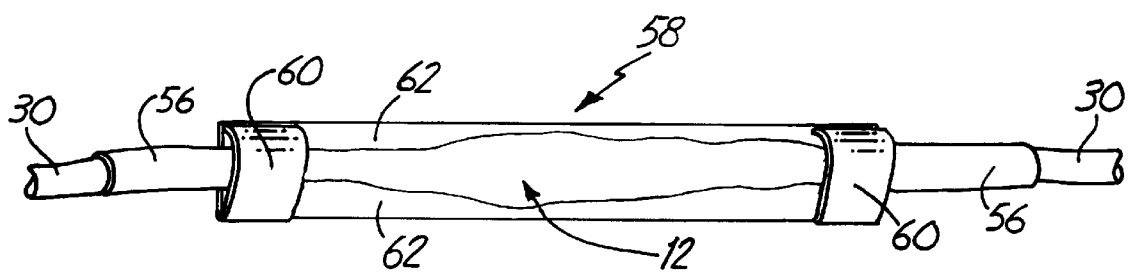
FIG. 7 is an top view of the thermistor with the bridging clip.
Figure 8:
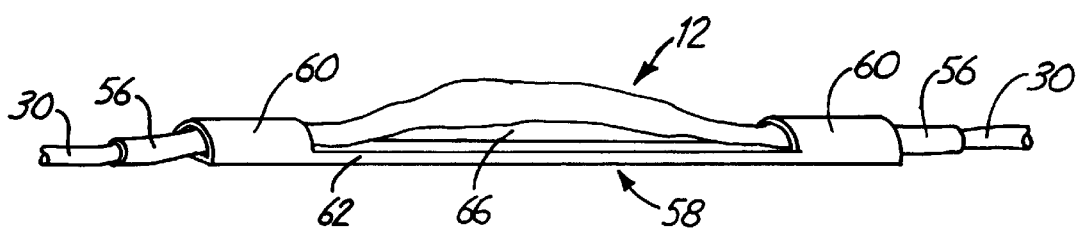
FIG. 8 is a side view of the thermistor with the bridging clip.

While the shrinkwrap 56 provides significant advantages, the shrinkwrap 56 by itself is not sufficient for many applications. FIGS. 6–8 show further assembly to arrive at the preferred thermistor configuration of the present invention using a bridging clip 58. The bridging clip 58 may be formed of any tension-supporting substance. The preferred bridging clip 58 has a C-shape, including two crimping tabs 60 separated by a tension supporting arm 62. For instance, the bridging clip 58 may be between two and three inches long, with spacing between crimping tabs 60 of about an inch and a half. The tension supporting arm 62 may be about ⅓ of an inch wide.

The preferred bridging clip 58 is rigid but bendable in a manufacturing environment. In the preferred embodiment, the bridging clip 58 is formed of a thin metal, with the shape formed such as by cutting or stamping from sheet metal. The thickness or the sheet metal should be sufficient to make the bridging clip 58 generally rigid and strong, but which can be bent around the wire and sheathing 30 and maintain that shape. For instance, aluminum or steel sheet metal of about ¹⁄₁₆th of an inch thickness may be used.

As shown in FIGS. 7 and 8, the shrinkwrapped thermistor 12 is positioned between the two crimping tabs 60 of the bridging clip 58. As previously described, the shrinkwrap 56 extends over a portion of the sheathing 30. The crimping tabs 60 are bent over the shrinkwrap 56 and around the sheathing 30 at opposing ends of the thermistor connection. The crimping tabs 60 are bent around this overlap area in order to attach to the sheathing 30. Given the slightly compressible nature of the wire insulation, the sheathing 30 and the shrinkwrap 56, the crimping tabs 60 rigidly secure or clamp the bridging clip 58 to the cable (14, 16, 18 or 20). The tension supporting arm 62 transfers tensile and bending stresses from one cable to the next, away from the electrical connections of the thermistor. Workers skilled in the art will appreciate that many other means of attaching the bridging clip 58 to the sheathing 30 could be used, but the crimping tabs 60 provide a clean, easily assembled, sturdy form of attachment at low cost.

As shown, the bridging clips 58 are formed of a thin metal, and the tension supporting arm 62 extends only along one side of each thermistor. If possible, the sensor 10 should be positioned such that the tension supporting arms 62 are on the downwind side of each thermistor 12. In this downwind orientation, the bridging clips 58 provide no thermal insulating effect or airshield effect for the thermistor 12, so the thermistor 12 has as rapid a response time as possible. The bridging clips 58 are thin so as to allow for rapid temperature variation consistent with rapid air temperature changes within the duct. If the bridging clip 58 is made too thick, the bridging clip 58 may have too much thermal mass for its temperature to change rapidly. Thus, the bridging clip 58 should be formed of a material and made small enough that it does not as a thermal source/sink affecting the temperature readings of the thermistor 12.

The bridging clips 58 relieve tension from the connection points during use. By clamping the two ends of the shrinkwrap 56 with the metal bridging clip 58, the bridging clip 58 protects the thermistor 12 from unwanted impacts, and the ends of the shrinkwrap 56 are supported so as to assist in translating tension away from the thermistor connections.

In the event that a thermistor must be replaced or a connection reestablished, the tabs 60 of the bridging clip 58 can be bent back and the shrinkwrap 56 cut away to expose the thermistor connections for repair. The shrinkwrap 56 can then be easily replaced and the bridging clip 58 re-attached. In addition to its other benefits, the shrinkwrap 56 also protects the electrical connections from contacting the metal bridging clip 58.

As shown in FIG. 8, once the rigid bridging clip 58 is clamped over the shrinkwrap 56, the entire thermistor 12 including its leads is fully within the space defined between the clamping tabs 60. The bridging clip 58 attaches solely over the sheathing 30 and the ends of the shrinkwrap 56, so that the bridging clip 58 does not put any tension on the thermistor 12. In the preferred embodiment, there is a small space 66 between the shrinkwrap 56 around the thermistor 12 and the bridging clip body to allow air to pass between the bridging clip 58 and the thermistor. Thus, the bridging clip 58 has virtually no influence on the sensed temperature.

Figure 9:
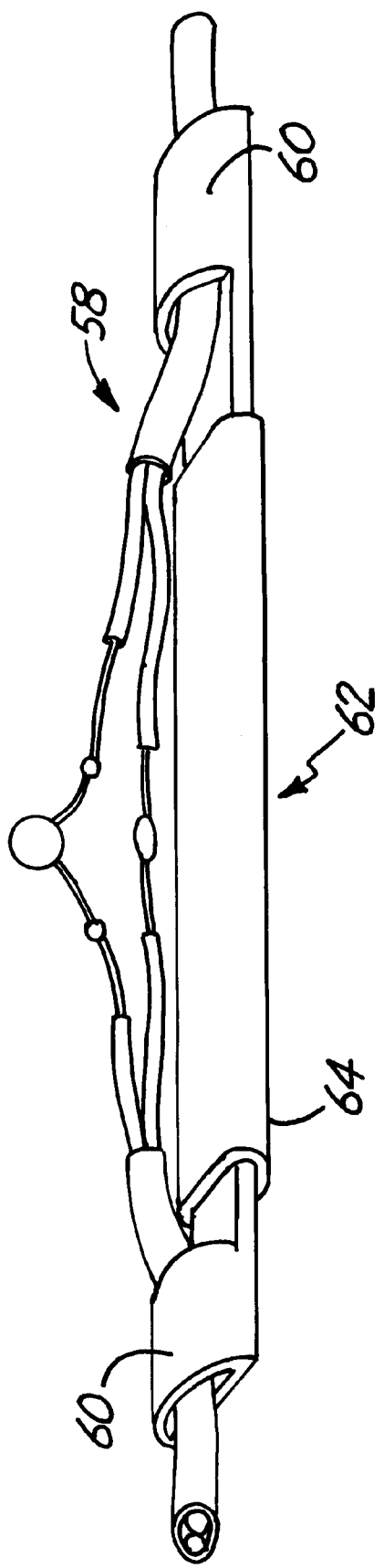
FIG. 9 is a side view of the thermistor coupling with an alternative bridging clip.

As shown in FIG. 9, an alternative arrangement can be employed to perform the electrically insulative function of the shrinkwrap 56. Specifically, an electrical insulator 64 may be placed over the middle section 62 of the metallic bridging clip 58 to prevent inadvertent electrical contact between the thermistor 12 and the bridging clip 58. However, unless the thermistor 12 is also wrapped, the connections remain exposed. As another alternative, shrinkwrap could be placed around the thermistor and the electrical connections, and a second wrap could be placed over the thermistors and the bridging clip. However, the second layer of shrinkwrap would also provide an unwanted layer of insulation from the air flow.

The shrinkwrap 56 and/or the bridging clips 58 of the present invention are readily visually perceptible relative to the sheathing 30. For instance, the sheathing 30 may be white, the shrinkwrap 56 may be black, and the bridging clips 58 may be metallic. By being visually perceptible, each thermistor location is readily identifiable, so the installer can easily configure the temperature sensor 10 to position the thermistors 12 properly in the duct 54 as shown in FIG. 3.

Although the present invention has been described with reference to preferred embodiments, workers skilled in the art will recognize that changes may be made in form and detail without departing from the spirit and scope of the invention.

What is claimed is:

1. A temperature sensor for approximating fluid temperature averaged at multiple points, the sensor comprising:
   a plurality of thermistors, each thermistor having a first lead, a second lead, and a sensing element which changes electrical response between the first and second leads as a function of temperature;
   circuit wires electrically connecting the thermistors in a spaced relationship in a circuit via attachment to the leads, each circuit wire being formed of metal;
   sheathing around the circuit wires, such that a single sheathing defines a sheathing lumen containing all circuit wires running between adjacent, electrically connected thermistors; and
   clips bridging each thermistor, each clip having a first attachment tab for securing to the sheathing on one side of the thermistor, a second attachment tab for securing to the sheathing on the other side of the thermistor, and a bridge portion running between the first attachment tab and the second attachment tab, the bridge portion being sufficiently strong to transfer stress between attached sheathings,
   wherein first sheathing on one side of the thermistor terminates at an end located prior to an electrical connection between the circuit wire and the first lead of the thermistor on that one side of the thermistor, and wherein second sheathing on the other side of the thermistor begins at a start located after an electrical connection between the second lead of the thermistor and the circuit wire on that other side of the thermistor, the sensor further comprising:
   insulation defining an insulation lumen extending over each thermistor from the end of the first sheathing on one side to the start of the second sheathing on the other side of each thermistor, the insulation being formed of a dielectric material;
   wherein the attachment tabs of the clips are bent around the insulation and the sheathing, and wherein the bridge portion extends outside the insulation.

2. The temperature sensor of claim 1, wherein the insulation is shrinkwrap sized to fit over the thermistor, the first and second leads, connections between the first and second leads and the circuit wires, and the end and the start of the sheathing, such that the shrinkwrap connects the end of the first sheathing to the start of the second sheathing, the shrinkwrap being formed of a thermally shrinkable material.

3. A temperature sensor for approximating fluid temperature averaged at multiple points, the sensor comprising:
   a plurality of thermistors, each thermistor having a first lead, a second lead, and a sensing element which changes electrical response between the first and second leads as a function of temperature;
   circuit wires electrically connecting the thermistors in a spaced relationship in a circuit via attachment to the leads, each circuit wire being formed of metal;
   sheathing around the circuit wires, such that a single sheathing defines a sheathing lumen containing all circuit wires running between adjacent, electrically connected thermistors, wherein the sheathing is formed of a flexible, dielectric material; and clips bridging each thermistor, each clip having a first attachment tab for securing to the sheathing on one side of the thermistor, a second attachment tab for securing to the sheathing on the other side of the thermistor, and a bridge portion running between the first attachment tab and the second attachment tab, the bridge portion being sufficiently strong to transfer stress between attached sheathing, and wherein the only metal extending within the sheathing at the attachment tabs is provided by the circuit wires.

4. The temperature sensor of claim 3, wherein the thermistors all have substantially equal resistances at a given temperature, and wherein the thermistors are connected in a square parallel/series array.

5. The temperature sensor of claim 4, wherein the square parallel/series array is wired in a single line with substantially equal longitudinal spacing between adjacent thermistors along the length of the circuit.

6. The temperature sensor of claim 3, wherein the clips are formed of sheet material, and wherein the attachment tabs secure to the sheathing by bending so as to crimp each attachment tab to the sheathing.

7. The temperature sensor of claim 3, wherein the clips are formed of sheet metal.

8. The temperature sensor of claim 3, wherein the first and second leads of the thermistors are spliced to the circuit wires.

9. The temperature sensor of claim 3, wherein each circuit wire is separately electrically insulated within the sheathing.

10. The temperature sensor of claim 3, wherein at least two circuit wires run between every set of adjacent, electrically connected thermistors.

11. The temperature sensor of claim 3, wherein the sheathing is plenum rated.

12. A temperature sensor for approximating fluid temperature averaged at multiple points, the sensor comprising:

a plurality of thermistors, each thermistor having a first lead, a second lead, and a sensing element which changes electrical response between the first and second leads as a function of temperature;

circuit wires electrically connecting the thermistors in a spaced relationship in a circuit via attachment to the leads, each circuit wire being formed of metal, wherein at least two circuit wires run between every set of adjacent, electrically connected thermistors;

sheathing around the circuit wires, such that a single sheathing defines a sheathing lumen containing all circuit wires running between adjacent, electrically connected thermistors, the sheathing being formed of a plenum-rated, flexible, dielectric material, wherein first sheathing on one side of the thermistor terminates at an end located prior to an electrical connection between the circuit wire and the first lead of the thermistor on that one side of the thermistor, and wherein second sheathing on the other side of the thermistor begins at a start located after an electrical connection between the second lead of the thermistor and the circuit wire on that other side of the thermistor, the sensor further comprising:

insulation defining an insulation lumen extending over each thermistor from the end of the first sheathing on one side to the start of the second sheathing on the other side of each thermistor, the insulation being formed of a dielectric material;

clips bridging each thermistor, each clip having a first attachment tab for securing to the sheathing on one side of the thermistor, a second attachment tab for securing to the sheathing on the other side of the thermistor, and a bridge portion running between the first attachment tab and the second attachment tab, the bridge portion being sufficiently strong to transfer stress between attached sheathing, wherein the attachment tabs of the clips are bent around the insulation and the sheathing, and wherein the bridge portion extends outside the insulation.

13. The temperature sensor of claim 12, wherein each thermistor location is visually perceptible.

14. A temperature sensor for approximating fluid temperature averaged at multiple points, the sensor comprising:

a plurality of thermistors, each thermistor having a first lead, a second lead, and a sensing element which changes electrical response between the first and second leads as a function of temperature;

circuit wires electrically connecting the thermistors in a spaced relationship in a circuit via attachment to the leads, each circuit wire being formed of metal;

dielectric insulation around the circuit wires, wherein the dielectric insulation is formed of a flexible material; and clips bridging each thermistor, each clip having a first attachment tab secured to the dielectric insulation on one side of the thermistor, a second attachment tab secured to the dielectric insulation on the other side of the thermistor, and a bridge portion running between the first attachment tab and the second attachment tab, the bridge portion being sufficiently strong to transfer stress between attached dielectric insulations, wherein the only metal extending within the dielectric insulations at the attachment tabs is provided by the circuit wires.

15. A method of constructing a multiple point averaging temperature sensor, the method comprising:

electrically connecting a plurality of thermistors with circuit wires such that the thermistors are in a spaced relationship in a circuit;

placing sheathing around the circuit wires, such that a single sheathing defines a sheathing lumen containing all circuit wires running between adjacent, electrically connected thermistors;

attaching clips to bridge each thermistor, each clip having a bridge portion extending between a first attachment tab and a second attachment tab, the attaching act comprising:

securing a first attachment tab of each clip to first sheathing on one side of its corresponding thermistor such that the only metal extending within the first sheathing at the first attachment tab is provided by the circuit wires; and securing a second attachment tab of each clip to second sheathing on the other side of its corresponding thermistor such that the only metal extending within the second sheathing at the second attachment tab is provided by the circuit wires, such that the bridge portion can transfer stress between attached sheathings.

16. The method of claim 15, wherein all circuit wires have ends adjacent each thermistor, and wherein the electrically connecting act comprises:

electrically connecting first and second leads of the thermistors to first and second ends of the circuit wires; and electrically connecting pairs of remaining terminating and starting ends of the circuit wires.

17. The method of claim 15, further comprising:

shrinking insulation over each thermistor and over all electrically connected ends of the circuit wires from the first sheathing on one side to the second sheathing on the other side of each thermistor prior to attaching the clips, such that each shrinkwrap connects the first sheathing to the second sheathing in addition to the connection provided by each clip.

18. The method of claim 15, wherein the clips are formed of sheet material, and wherein each securing act comprises:

bending the attachment tab around the sheathing so as to crimp each attachment tab to the sheathing.

* * * * *